(12) United States Patent
Zhang

(10) Patent No.: US 12,473,045 B1
(45) Date of Patent: Nov. 18, 2025

(54) TRAILER PALLET

(71) Applicant: Hao qian Zhang, Xiamen (CN)

(72) Inventor: Hao qian Zhang, Xiamen (CN)

( * ) Notice: Subject to any disclaimer, the term of this patent is extended or adjusted under 35 U.S.C. 154(b) by 0 days.

(21) Appl. No.: 18/762,696

(22) Filed: Jul. 3, 2024

(51) Int. Cl.
*B60R 9/00* (2006.01)
*B60R 9/06* (2006.01)
*B60R 11/00* (2006.01)
*B62D 63/08* (2006.01)
*B60P 1/64* (2006.01)

(52) U.S. Cl.
CPC ............... *B62D 63/08* (2013.01); *B60R 9/06* (2013.01); *B60P 1/64* (2013.01); *B60P 1/6409* (2013.01); *B60R 11/00* (2013.01); *B60R 2011/0084* (2013.01)

(58) Field of Classification Search
CPC ..... B60R 9/00; B60R 9/06; B60R 2011/0084; B60R 7/08; B62D 63/08; B60P 1/64; B60P 1/6409
USPC .......... 296/37.1, 182.1; 224/42.32, 548, 545, 224/555, 558, 400, 401
See application file for complete search history.

(56) References Cited

U.S. PATENT DOCUMENTS

| | | | | |
|---|---|---|---|---|
| 5,219,105 A * | 6/1993 | Kravitz | ..................... | B60R 9/10 224/511 |
| 5,938,092 A * | 8/1999 | Johnson | ..................... | B60R 9/06 224/523 |
| 5,979,972 A * | 11/1999 | Gehman | ..................... | B60P 3/34 296/184.1 |
| 6,089,428 A * | 7/2000 | Wagner | ..................... | B60R 9/10 224/511 |
| 9,333,822 B1 * | 5/2016 | LaFave | ..................... | B60R 9/06 |
| 11,554,710 B1 * | 1/2023 | Bledsoe | ................. | B60R 11/00 |
| 2008/0061097 A1 * | 3/2008 | Milender | .................. | B60R 9/06 224/524 |
| 2008/0231029 A1 * | 9/2008 | Hummel | ................... | B60R 9/06 224/510 |
| 2012/0168480 A1 * | 7/2012 | Gray | ...................... | B60P 3/1075 224/400 |
| 2013/0092714 A1 * | 4/2013 | Niemi | ....................... | B60P 3/36 224/401 |
| 2015/0027813 A1 * | 1/2015 | Hill | ......................... | F16M 13/02 182/151 |
| 2016/0031377 A1 * | 2/2016 | Pemberton | ................ | B60R 9/06 224/519 |
| 2017/0197555 A1 * | 7/2017 | Hack | ........................ | B60D 1/58 |
| 2025/0083758 A1 * | 3/2025 | Williams | ............... | B62D 63/08 |

* cited by examiner

*Primary Examiner* — Gregory A Blankenship
(74) *Attorney, Agent, or Firm* — Jose Cherson Weissbrot

(57) ABSTRACT

A trailer pallet is provided, including a V-shaped connecting base. Two first support rods are provided at the top of the V-shaped connecting base. A first adjustment rod is slidably connected inside each of the two first support rods. Two second support rods are provided at the top of the V-shaped connecting base. A second adjustment rod is slidably connected inside each of the two second support rods. The two first support rods and the two second support rods are arranged in a trapezoidal shape. A pallet body is provided above the V-shaped connecting base, and a connecting mechanism is provided at the bottom of the pallet body. In the present disclosure, the first support rods and the two second support rods are arranged in a trapezoidal shape, which can increase the load-bearing capacity of the pallet and prevent the pallet from tilting and shaking when loaded with goods.

9 Claims, 6 Drawing Sheets

TRAILER PALLET

TECHNICAL FIELD

The present disclosure relates to the technical fields of logistics and transportation tools, and particularly to a trailer pallet.

BACKGROUND

Trailer pallets generally refer to metal or plastic platforms for conveying and dragging items and are usually installed on the V-shaped base of a trailer. Trailer pallets are designed to be firm and durable, load-bearing, and safe in use. There are many types of trailer pallets with different sizes, making it adapt to vehicles of different types and sizes. Trailer pallets have been widely used in fields including vehicle rescue, transportation, and handling, which can improve the transportation efficiency while ensuring the safety of a vehicle during movement.

Currently, a trailer pallet support base can usually be used only at a fixed angle to install the pallet, with low flexibility and poor adjustability, which may limit the use of the pallet in goods or vehicles of specific types or sizes, thus failing to meet diverse transportation needs. At the same time, the existing trailer pallet support base exhibits a less desired support effect, resulting in poor stability of the pallet loaded with goods. During transportation, if the pallet cannot provide sufficient support, the goods may tilt, shake, or even overturn, increasing the risk of goods damage and vehicle accidents.

SUMMARY

The objective technical problem to be solved by the present disclosure is that the existing trailer pallet support base can usually be used only at a fixed angle to install the pallet, with low flexibility and poor adjustability, and meanwhile, the existing trailer pallet support base exhibits a less desired support effect and a poor stability.

As shown in FIGS. 1-5, to solve the above problem, one technical solution adopted by the present disclosure is as follows. A trailer pallet includes a V-shaped connecting base. Two first support rods are provided at the top of the V-shaped connecting base. A first adjustment rod is slidably connected inside each of the two first support rods. Two second support rods are provided at the top of the V-shaped connecting base. A second adjustment rod is slidably connected inside each of the two second support rods. The two first support rods and the two second support rods are arranged in a trapezoidal shape. A pallet body is provided above the V-shaped connecting base, and a connecting mechanism is provided at the bottom of the pallet body.

Through the above technical solution, since the two first support rods and the two second support rods are arranged in a trapezoidal shape, the gravity of the pallet and the goods can be more evenly distributed on multiple support points, reducing the pressure on each support point and providing more stable support, thus broadening the scope of application of the trailer pallet.

Further, the first adjustment rod is provided with a plurality of first limiting holes. The first support rod and the first adjustment rod are fixedly connected through a first mounting assembly. A fixed mounting base is fixedly connected on one side of the first support rod. The second adjustment rod is provided with a plurality of second limiting holes. The second support rod and the second adjustment rod are fixedly connected through the first mounting assembly.

Two sliding members (rails) are provided below the pallet, the first adjustment rod is connected to the sliding rail through the sliding block and then connected to the pallet, the second adjustment rod is fixed on the fixed crossbar in the fixed rail casing through the first fixed mounting block and then connected to the pallet.

Through the above technical solution, since the first support rod and the second support rod are fixed on different positions of the sliding rail, the trailer pallet can be mounted on the trailer V-shaped bases of different sizes, thereby adapting to different trailers, and exhibiting enhanced applicability.

Further, a mounting crossbar is fixedly connected at the bottom of the first support rod, and a mounting crossbar is provided at the bottom of the V-shaped connecting base. Each mounting crossbar is provided with a plurality of first connecting holes. Two mounting crossbars are fixedly connected to the V-shaped connecting base through a second mounting assembly. A reinforcing rib is fixedly connected at the bottom of the pallet body.

Further, the second support rod is provided with a mounting leg base at one end close to the V-shaped connecting base, and a mounting plate is provided on one side the V-shaped connecting base. Each of the mounting leg base and the mounting plate is provided with a plurality of second connecting holes. The mounting leg base and the mounting plate are fixedly connected to the V-shaped connecting base through the second mounting assembly.

Further, the connecting mechanism includes a fixed rail casing fixedly connected to the bottom of the pallet body: A fixed crossbar is provided in the fixed rail casing, and a second fixed mounting block is provided at the bottom of the fixed crossbar. The fixed crossbar and the fixed rail casing are fixedly connected through the second fixed mounting block and the first mounting assembly.

Through the above technical solution, the reinforcing rib can increase the load-bearing capacity of the pallet, ensure that the pallet will not be deformed or damaged during transportation, and can safely convey heavier goods, thereby reducing maintenance and replacement costs. Further, a sliding block is fixedly connected at one end of the first adjustment rod away from the V-shaped connecting base. A sliding rail is fixedly connected at the bottom of the pallet body. The sliding block is slidably and fixedly connected to the sliding rail through a screw fastener. The sliding rail and the sliding block are fixedly connected through the first mounting assembly.

Further, as shown in FIGS. 6-7, a first fixed mounting block is fixedly connected at one end of the second adjustment rod away from the V-shaped connecting base, and the fixed crossbar is provided on the other side of the first fixed mounting block. The fixed crossbar and the first fixed mounting block are fixedly connected through the first mounting assembly.

Further, the connecting mechanism includes a first fixing plate fixedly connected to the bottom of the pallet body. The first fixing plate is provided with a plurality of first mounting holes. Each of two ends of the first fixing plate is provided with a second fixing plate. The second fixing plate is provided with a plurality of third mounting holes.

Further, an L-shaped mounting plate is fixedly connected at one end of the first adjustment rod away from the V-shaped connecting base, another L-shaped mounting plate is fixedly connected at one end of the second adjustment rod away from the V-shaped connecting base, respectively. The L-shaped mounting plate and the second fixing plate are fixedly connected through the first mounting assembly. The first fixing plate and the second fixing plate are fixedly connected through the first mounting assembly:

Further, one side of the pallet body is provided with a plurality of second mounting holes. The L-shaped mounting plate and the pallet body are fixedly connected through the first mounting assembly.

The present disclosure has the following beneficial effects:
1. In the present disclosure, the distance between the two first support rods can be adjusted to realize installation on different trailer V-shaped bases, thereby adapting to the needs of carrying goods by different trailers, and enhancing its applicability. Goods, with either large or small size, can be received and supported by replacing an appropriate pallet and ensured to be placed on the pallet stably, reducing the risk of goods tilting or slipping, and improving safety during transportation:
2. In the present disclosure, the adjustment of the positions of the first support rod and the second support rod allows installation on trailer V-shaped bases of different angles, and the position and direction of the pallet can be better controlled and adjusted according to the size and weight of the goods. During transportation, avoiding obstacles or adjusting position can reduce the possibility of accidental collisions or accidents;
3. In the present disclosure, the two first support rods and the two second support rods are arranged in a trapezoidal shape, which can provide a larger support area, reduce the possibility of local stress concentration, improve its load-bearing capacity, and prevent the pallet from tilting and shaking when loaded with goods, improving the stability of the entire trailer system.

Figure 1:
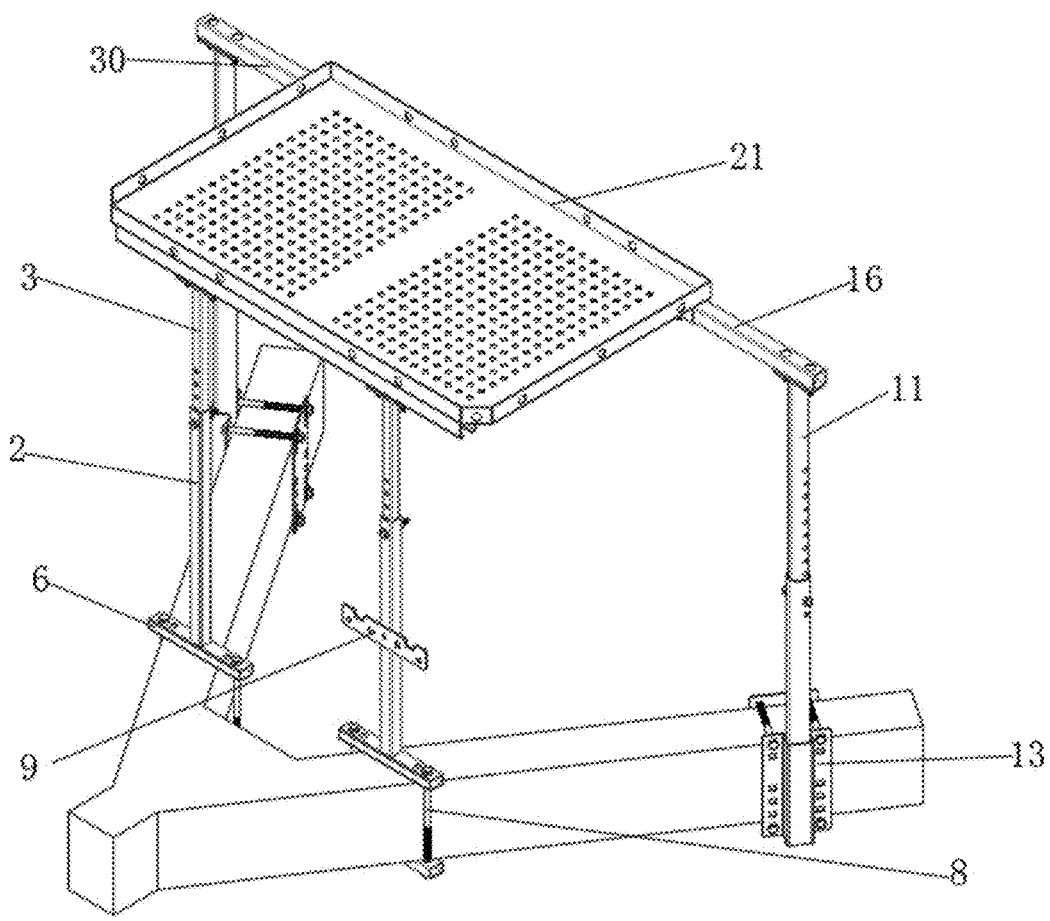
FIG. 1 is a three-dimensional structural view of the present disclosure from a first perspective.
Figure 2:
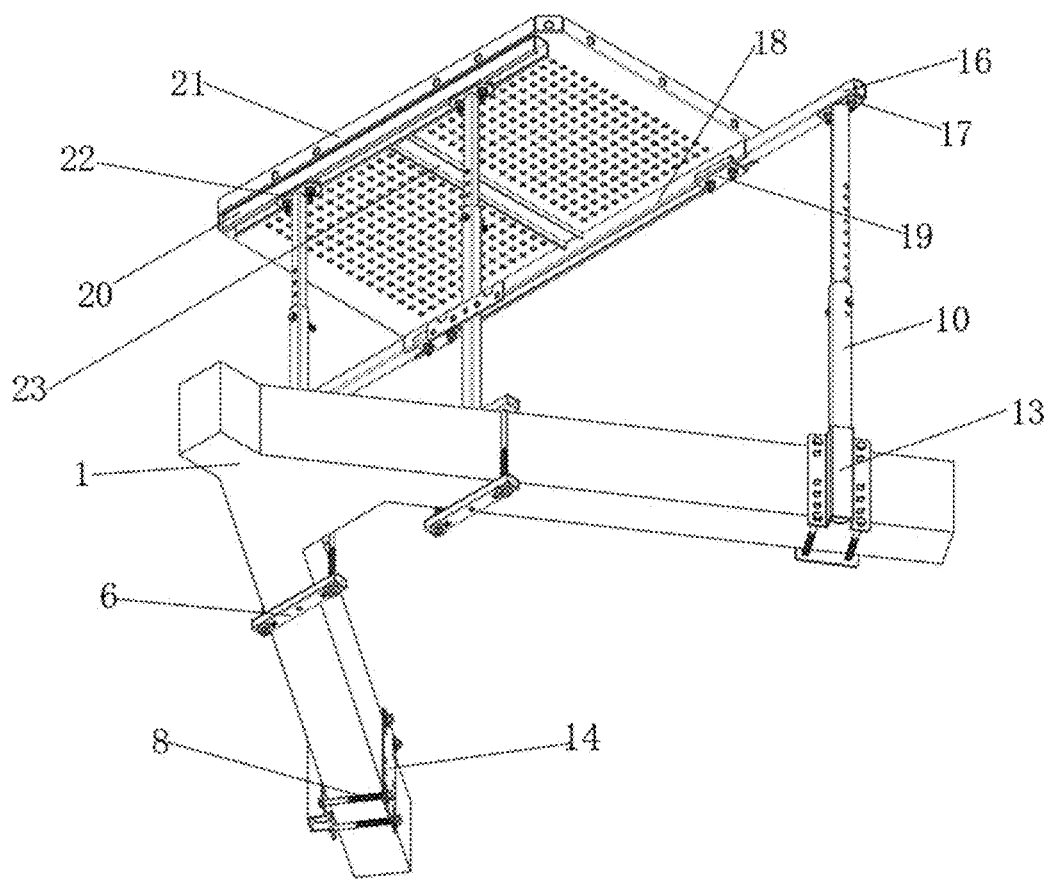
FIG. 2 is a three-dimensional structural view of the present disclosure from a second perspective.
Figure 3:
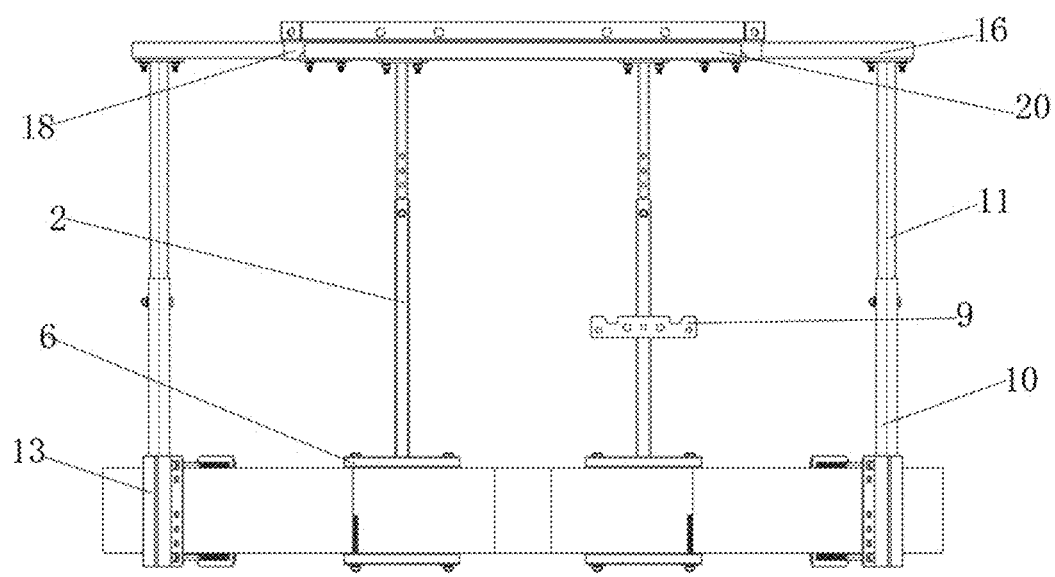
FIG. 3 is a plan view showing the structure of the present disclosure.
Figure 4:
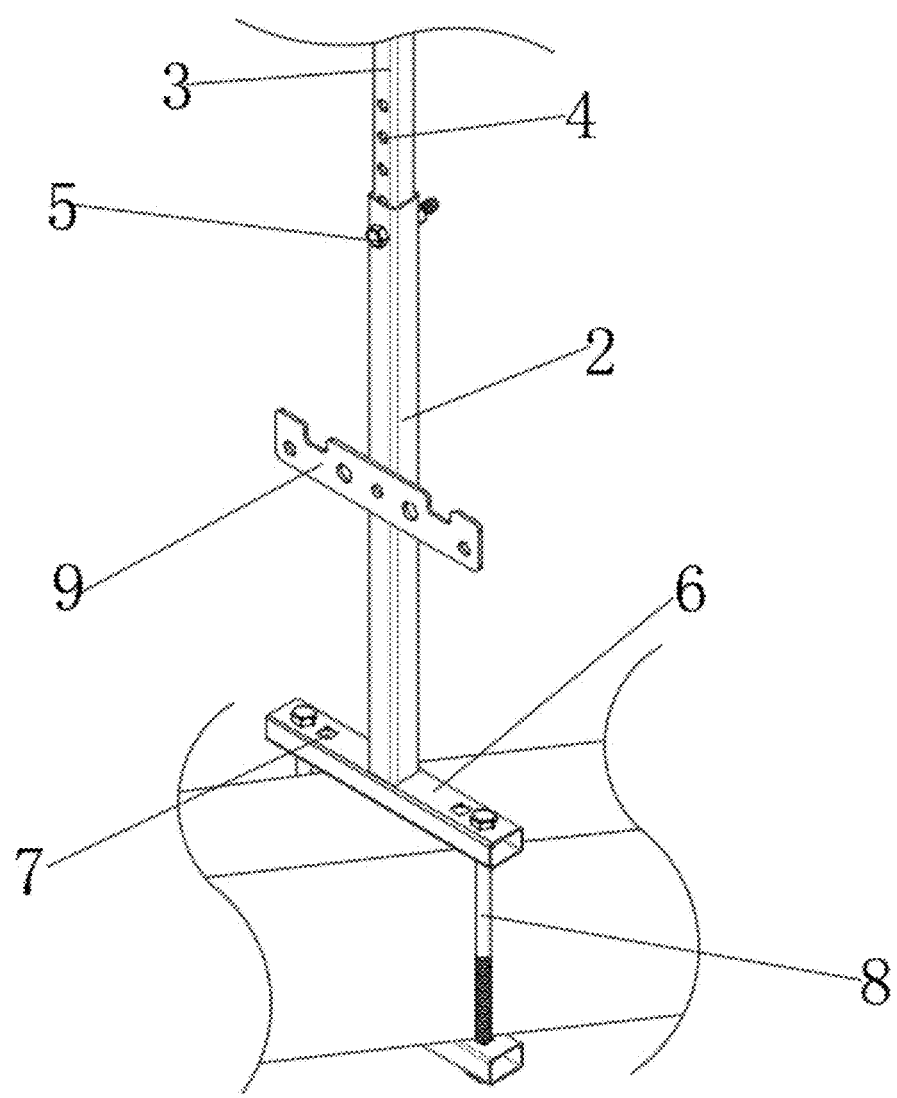
FIG. 4 is a three-dimensional structural view of the mounting crossbar of the present disclosure.
Figure 5:
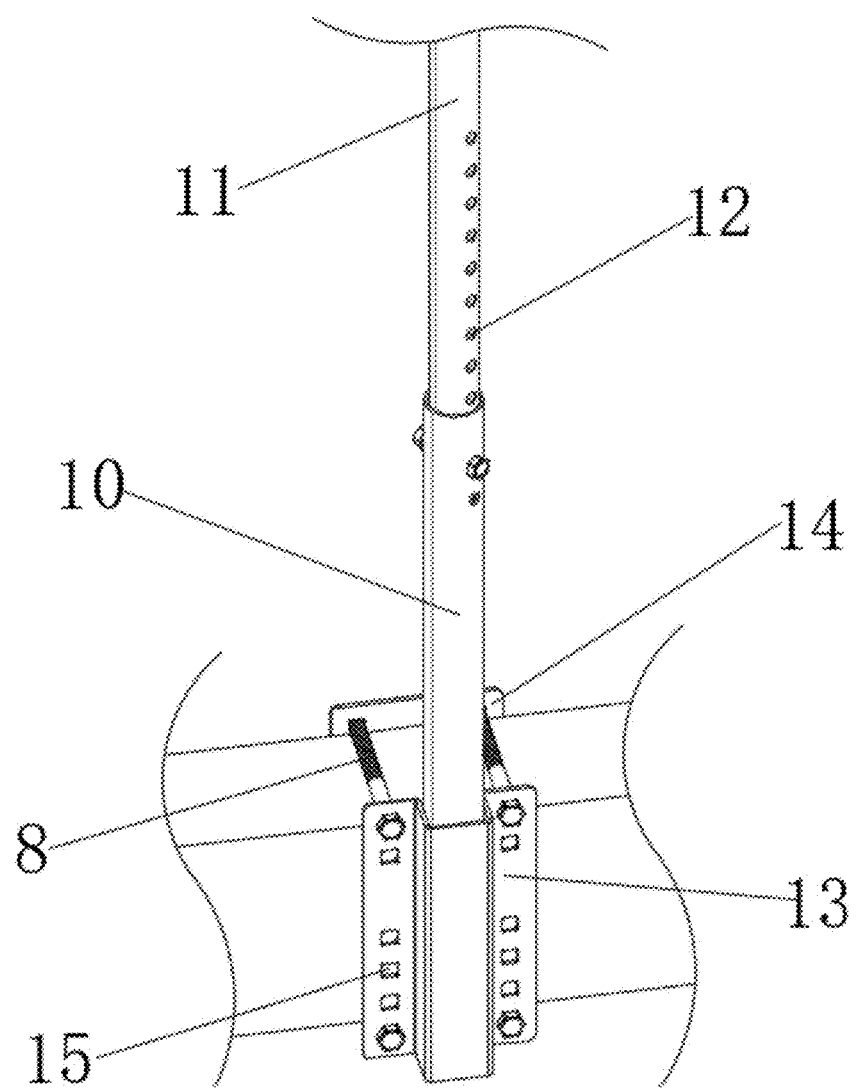
FIG. 5 is a three-dimensional structural view of the mounting leg base of the present disclosure.

In the figures: 1. V-shaped connecting base; 2. first support rod; 3. first adjustment rod; 4. first limiting hole; 5. first mounting assembly; 6. mounting crossbar; 7. first connecting hole; 8, second mounting assembly; 9. fixed mounting base; 10. second support rod; 11. second adjustment rod; 12. second limiting hole; 13. mounting leg base; 14. mounting plate; 15. second connecting hole; 16. fixed crossbar; 17. first fixed mounting block; 18. fixed rail casing; 19. second fixed mounting block; 20. sliding rail; 21. pallet body; 22. sliding block; 23. reinforcing rib; 24. L-shaped mounting plate; 25. first fixing plate; 26. second fixing plate; 27. first mounting hole; 28. second mounting hole; 29, third mounting hole; 30, connecting mechanism.

DETAILED DESCRIPTION OF THE EMBODIMENTS

The preferred embodiments of the present disclosure will be described in detail below in conjunction with the accompanying drawings, so that the advantages and features of the present disclosure can be more easily understood by those skilled in the art, thereby defining the protection scope of the present disclosure more clearly.

Embodiment 1

Referring to FIG. 1 to FIG. 5, a trailer pallet includes a V-shaped connecting base 1. Two first support rods 2 are provided at the top of the V-shaped connecting base 1. A first adjustment rod 3 is slidably connected inside each of the two first support rods 2. Two second support rods 10 are provided at the top of the V-shaped connecting base 1. A second adjustment rod 11 is slidably connected inside each of the two second support rods 10. The two first support rods 2 and the two second support rods 10 are arranged in a trapezoidal shape. A pallet body 21 is provided above the V-shaped connecting base 1, and a connecting mechanism 30 is provided at the bottom of the pallet body 21.

The first adjustment rod 3 is provided with a plurality of first limiting holes 4. The first support rod 2 and the first adjustment rod 3 are fixedly connected through a first mounting assembly 5. A fixed mounting base 9 is fixedly connected on one side of the first support rod 2. The second adjustment rod 11 is provided with a plurality of second limiting holes 12. The second support rod 10 and the second adjustment rod 11 are fixedly connected through the first mounting assembly 5.

A mounting crossbar 6 is fixedly connected at the bottom of the first support rod 2, and a mounting crossbar 6 is provided at the bottom of the V-shaped connecting base 1. Each mounting crossbar 6 is provided with a plurality of first connecting holes 7. Two mounting crossbars 6 are fixedly connected to the V-shaped connecting base 1 through a second mounting assembly 8. A reinforcing rib 23 is fixedly connected at the bottom of the pallet body 21. The second support rod 10 is provided with a mounting leg base 13 at one end close to the V-shaped connecting base 1, and a mounting plate 14 is provided on one side the V-shaped connecting base 1. Each of the mounting leg base 13 and the mounting plate 14 is provided with a plurality of second connecting holes 15. The mounting leg base 13 and the mounting plate 14 are fixedly connected to the V-shaped connecting base 1 through the second mounting assembly 8.

The connecting mechanism 30 includes a fixed rail casing 18 fixedly connected to the bottom of the pallet body 21. A fixed crossbar 16 is provided in the fixed rail casing 18, and a second fixed mounting block 19 is provided at the bottom of the fixed crossbar 16. The fixed crossbar 16 and the fixed rail casing 18 are fixedly connected through the second fixed mounting block 19 and the first mounting assembly 5.

A sliding block 22 is fixedly connected at one end of the first adjustment rod 3 away from the V-shaped connecting base 1. A sliding rail 20 is fixedly connected at the bottom of the pallet body 21. The sliding block 22 is slidably connected to different positions of the sliding rail 20. The sliding rail 20 and the sliding block 22 are fixedly connected through the first mounting assembly 5. A first fixed mounting block 17 is fixedly connected at one end of the second adjustment rod 11 away from the V-shaped connecting base 1, and the fixed crossbar 16 is provided on the other side of the first fixed mounting block 17. The fixed crossbar 16 and the first fixed mounting block 17 are fixedly connected through the first mounting assembly 5.

When in use, an appropriate pallet body 21 can be selected according to the size of the goods to be transported. The distance between the two first support rods 2 is adjusted according to the width of the V-shaped base of a trailer, followed by securing the two first support rods 2 to the V-shaped connecting base 1 through the mounting crossbar 6 and the second mounting assembly 8. The distance between the second support rod 10 and the first support rod 2 is adjusted according to the length of the pallet body 21, followed by securing the second support rods 10 to the V-shaped connecting base 1 through the mounting leg base 13, the mounting plate 14, and the second mounting assembly 8. The length in which the first adjustment rod 3 and the second adjustment rod 11 extend can be adjusted according to actual needs, followed by fixing with the first mounting assembly 5 to prevent shaking, slidably inserting the sliding block 22 into the sliding rail 20, slidably inserting the fixed crossbar 16 into the fixed rail casing 18, and fixing with the first mounting assembly 5 to complete the installation of the pallet body 21. The two first support rods 2 and the two second support rods 10 are arranged in a trapezoidal shape, which reduces the possibility of local stress concentration and improves the stability of the entire trailer system.

Embodiment 2

Figure 6:
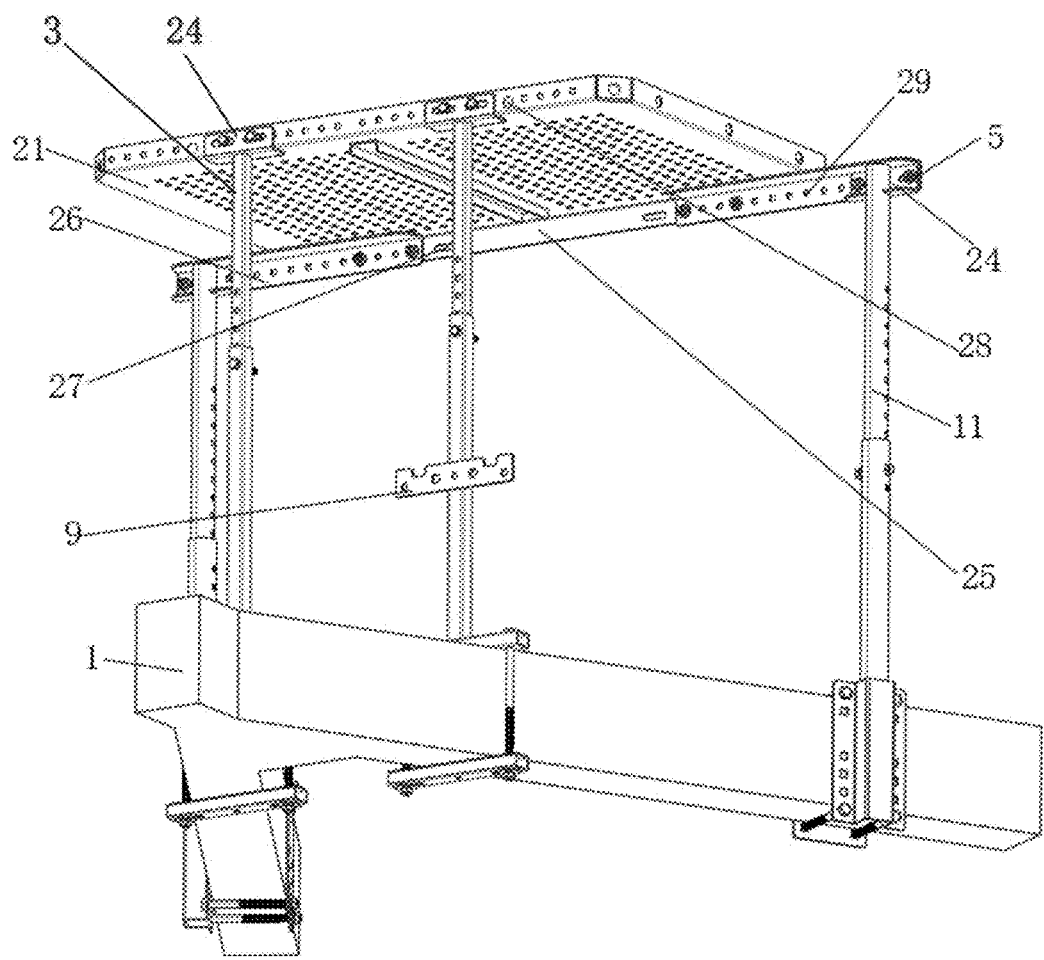
FIG. 6 is a three-dimensional structural view of Embodiment 2 of the present disclosure.
Figure 7:
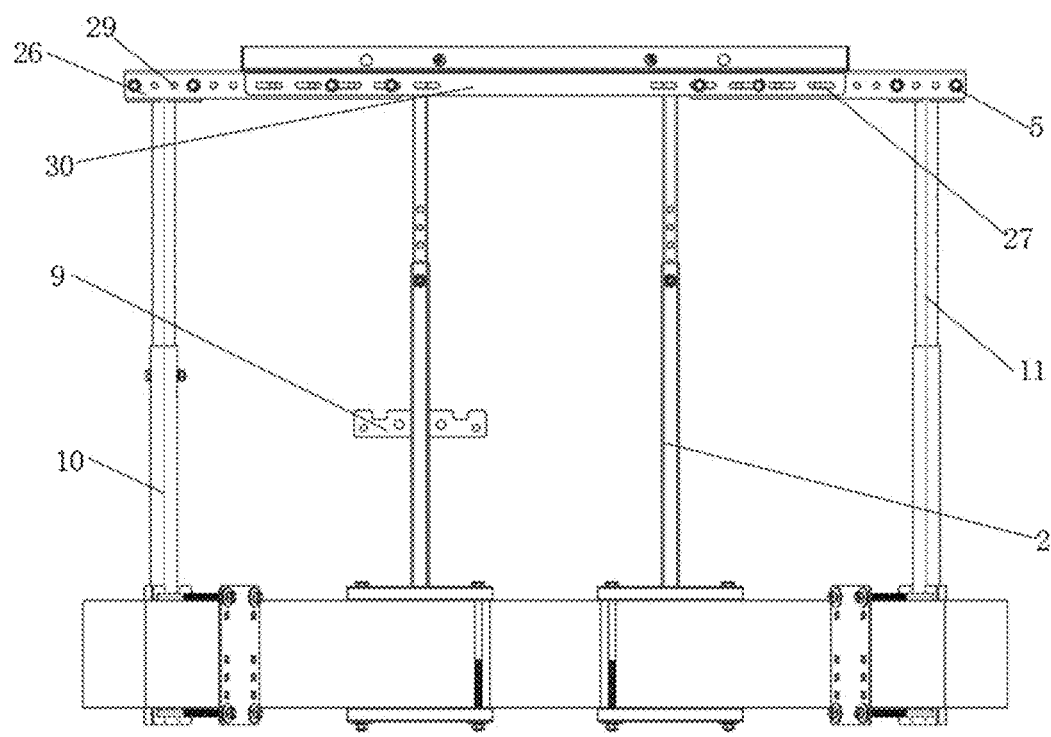
FIG. 7 is a plan view showing the structure of Embodiment 2 of the present disclosure.

As shown in FIG. 6 and FIG. 7, the present embodiment differs from Embodiment 1 in that the connecting mechanism 30 includes a first fixing plate 25 fixedly connected to the bottom of the pallet body 21. The first fixing plate 25 is provided with a plurality of first mounting holes 27. Each of two ends of the first fixing plate 25 is provided with a second fixing plate 26. The second fixing plate 26 is provided with a plurality of third mounting holes 29.

An L-shaped mounting plate 24 is fixedly connected at one end of the first adjustment rod 3 away from the V-shaped connecting base 1 and one end of the second adjustment rod 11 away from the V-shaped connecting base 1, respectively. The L-shaped mounting plate 24 and the second fixing plate 26 are fixedly connected through the first mounting assembly 5. The first fixing plate 25 and the second fixing plate 26 are fixedly connected through the first mounting assembly 5. One side of the pallet body 21 is provided with a plurality of second mounting holes 28. The L-shaped mounting plate 24 and the pallet body 21 are fixedly connected through the first mounting assembly 5.

When in use, the pallet body 21 and the two first adjustment rods 3 are fixed with the first mounting assembly 5 through the second mounting hole 28 and the L-shaped mounting plate 24. The second adjustment rod 11 and the second fixing plate 26 are fixed via the L-shaped mounting and the first mounting assembly 5, and the second fixing plate 26 and the first fixing plate 25 are fixed through the first mounting assembly 5. Thus, the installation of the pallet body 21 is completed. The two first support rods 2 and the two second support rods 10 are arranged in a trapezoidal shape, which reduces the possibility of local stress concentration and improves the stability of the entire trailer system.

The above are only embodiments of the present disclosure, and do not limit the patent scope of the present disclosure. Any equivalent structure or equivalent process transformation made by using the description and drawings of the present disclosure, or its direct or indirect use in other related technical fields, are all equally included in the scope of patent protection of the present disclosure.

What is claimed is:

1. A trailer pallet, comprising a V-shaped connecting base (1), wherein two first support rods (2) are provided at a top of the V-shaped connecting base (1), a first adjustment rod (3) is slidably connected inside each of the two first support rods (2), two second support rods (10) are provided at the top of the V-shaped connecting base (1), a second adjustment rod (11) is slidably connected inside each of the two second support rods (10), the two first support rods (2) and the two second support rods (10) are arranged in a trapezoidal shape, a pallet body (21) is provided above the V-shaped connecting base (1), and a connecting mechanism (30) is provided at a bottom of the pallet body (21), and wherein a mounting crossbar (6) is fixedly connected at a bottom of the two first support rods (2), and the mounting crossbar (6) is provided at a bottom of the V-shaped connecting base (1), each of the mounting crossbar (6) is provided with a plurality of first connecting holes (7), the mounting crossbar (6) is fixedly connected to the V-shaped connecting base (1) through a second mounting assembly (8), and a reinforcing rib (23) is fixedly connected at the bottom of the pallet body (21).

2. The trailer pallet according to claim 1, wherein the first adjustment rod (3) is provided with a plurality of first limiting holes (4), the first support rod (2) and the first adjustment rod (3) are fixedly connected through a first mounting assembly (5), a fixed mounting base (9) is fixedly connected on one side of the first support rod (2), the second adjustment rod (11) is provided with a plurality of second limiting holes (12), the second support rod (10) and the second adjustment rod (11) are fixedly connected through the first mounting assembly (5).

3. The trailer pallet according to claim 1, wherein the second support rod (10) is provided with a mounting leg base (13) at one end close to the V-shaped connecting base (1), and a mounting plate (14) is provided on one side the V-shaped connecting base (1), each of the mounting leg base (13) and the mounting plate (14) is provided with a plurality of second connecting holes (15), the mounting leg base (13) and the mounting plate (14) are fixedly connected to the V-shaped connecting base (1) through the second mounting assembly (8).

4. A trailer pallet comprising a V-shaped connecting base (1), wherein two first support rods (2) are provided at a top of the V-shaped connecting base (1), a first adjustment rod (3) is slidably connected inside each of the two first support rods (2), two second support rods (10) are provided at the top of the V-shaped connecting base (1), a second adjustment rod (11) is slidably connected inside each of the two second support rods (10), the two first support rods (2) and the two second support rods (10) are arranged in a trapezoidal shape, a pallet body (21) is provided above the V-shaped connecting base (1), and a connecting mechanism (30) is provided at a bottom of the pallet body (21);

wherein the connecting mechanism (30) comprises a fixed rail casing (18) fixedly connected to the bottom of the pallet body (21), a fixed crossbar (16) is provided in the fixed rail casing (18), a second fixed mounting block (19) is provided at a bottom of the fixed crossbar (16), and the fixed crossbar (16) and the fixed rail casing (18) are fixedly connected through the second fixed mounting block (19) and the first mounting assembly (5).

5. The trailer pallet according to claim 4, wherein a sliding block (22) is fixedly connected at one end of the first adjustment rod (3) away from the V-shaped connecting base (1), a sliding rail (20) is fixedly connected at the bottom of the pallet body (21), the sliding block (22) is slidably connected to the sliding rail (20), the sliding rail (20) and the sliding block (22) are fixedly connected through the first mounting assembly (5).

6. The trailer pallet according to claim 4, wherein a first fixed mounting block (17) is fixedly connected at one end of the second adjustment rod (11) away from the V-shaped connecting base (1), the fixed crossbar (16) is provided on the other side of the first fixed mounting block (17), the fixed crossbar (16) and the first fixed mounting block (17) are fixedly connected through the first mounting assembly (5).

7. A trailer pallet, comprising a V-shaped connecting base (1), wherein two first support rods (2) are provided at a top of the V-shaped connecting base (1), a first adjustment rod (3) is slidably connected inside each of the two first support rods (2), two second support rods (10) are provided at the top of the V-shaped connecting base (1), a second adjustment rod (11) is slidably connected inside each of the two second support rods (10), the two first support rods (2) and the two second support rods (10) are arranged in a trapezoidal shape, a pallet body (21) is provided above the V-shaped connecting base (1), and a connecting mechanism (30) is provided at a bottom of the pallet body (21);

wherein the connecting mechanism (30) comprises a first fixing plate (25) fixedly connected to the bottom of the pallet body (21), the first fixing plate (25) is provided with a plurality of first mounting holes (27), each of two ends of the first fixing plate (25) is provided with a second fixing plate (26), and the second fixing plate (26) is provided with a plurality of third mounting holes (29).

8. The trailer pallet according to claim 7, wherein an L-shaped mounting plate (24) is fixedly connected at one end of the first adjustment rod (3) away from the V-shaped connecting base (1) and one end of the second adjustment rod (11) away from the V-shaped connecting base (1), respectively, the L-shaped mounting plate (24) and the second fixing plate (26) are fixedly connected through the first mounting assembly (5), and the first fixing plate (25) and the second fixing plate (26) are fixedly connected through the first mounting assembly (5).

9. The trailer pallet according to claim 8, wherein one side of the pallet body (21) is provided with a plurality of second mounting holes (28), the L-shaped mounting plate (24) and the pallet body (21) are fixedly connected through the first mounting assembly (5).

\* \* \* \* \*